United States Patent [19]
Battle

[11] Patent Number: 6,002,410
[45] Date of Patent: Dec. 14, 1999

[54] RECONFIGURABLE TEXTURE CACHE

[75] Inventor: James T. Battle, San Jose, Calif.

[73] Assignee: Chromatic Research, Inc., Sunnyvale, Calif.

[21] Appl. No.: 08/918,226

[22] Filed: Aug. 25, 1997

[51] Int. Cl.[6] .................................................. G09G 5/00
[52] U.S. Cl. .......................... 345/513; 345/430; 345/508; 711/129; 711/170; 711/5
[58] Field of Search .................... 711/5, 170, 211, 711/118, 127, 129; 345/118, 147, 149, 430, 507–510, 513, 515, 516

[56]  References Cited

U.S. PATENT DOCUMENTS

| | | | |
|---|---|---|---|
| 5,410,669 | 4/1995 | Biggs et al. | 395/425 |
| 5,598,526 | 1/1997 | Daniel et al. | 345/507 |
| 5,914,725 | 6/1999 | MacInnis et al. | 345/441 |

FOREIGN PATENT DOCUMENTS 0 747 860  12/1996  European Pat. Off. ........ G06T 15/10

*Primary Examiner*—Kee M. Tung
*Attorney, Agent, or Firm*—Skjerven, Morrill, Macpherson, Franklin & Friel LLP; Edward C. Kwok

[57] ABSTRACT

A reconfigurable cache in a signal processor provides a cache optimized for texture mapping. In particular, the reconfigurable cache provides two-banks of memory during one mode of operation and a palettized map under a second mode of operation. In one implementation, the reconfigurable cache optimizes mip-mapping by assigning one texture map in one of the memory banks and a second texture map of a different resolution to the other memory bank. A special mapping pattern ("supertiling") between a graphical image to cache lines minimizes cache misses in texture mapping operations.

8 Claims, 6 Drawing Sheets

RECONFIGURABLE TEXTURE CACHE

BACKGROUND OF THE INVENTION

1. Field of the Invention

The present invention relates to computer-generated graphics. In particular, the present invention relates to the architecture of a reconfigurable texture cache and methods relating to the use of a texture cache.

2. Discussion of the Related Art

Texture mapping is a technique for mapping an image ("texture map") onto a surface of a computer-generated objected, so as to allow the object to appear more realistic in a displayed scene. The surfaces of the object are typically represented by polygons and texture mapping allows a texture to be superimposed onto each polygon, using transformation techniques that compensate the appearance of the texture in each polygon for lighting conditions, angles of viewing and other conditions which may affect the appearance of the object. Many elements of the theory and techniques of texture mapping are known to those skilled in the art.

Typically, the texture map is provided as a two-dimensional image represented in a coordinate system, referred to as "texture space" $T(u,v)$. Texture mapping maps the relevant portion or portions of the texture map onto the surfaces of the object provided in the object's three dimensional coordinate system, typically referred to as "object space" $O(x', y', z')$. The textured mapped image of the object can then be displayed the object on a graphical display by projecting the textured object onto a two-dimensional coordinate system "screen space" $S(x, y)$. A pixel within the texture is often referred to as a "texel".

The transformations which typically accompany texture mapping includes translation, rotation, modulations of surface color (sometimes referred to as "diffuse reflective coefficients") and specularity (a measure of the roughness of the object surface as it relates to the object's "shininess") and anti-aliasing. Texture maps, like most graphical images, are typically stored in memory optimized for access in raster scan line order. However, as used for texture mapping, the orientation of the mapped texture on an object surface is typically random, and benefits very little (from the stand point of minimizing the number of memory accesses to retrieve the texels), if at all, to the raster order.

A popular technique for anti-aliasing in this context is "mip-mapping", which attempts to provide a relevant "level of detail" of the texture map based on an apparent distance d of the object to the viewer. In mip-mapping, rather than texture mapping from a single image of the texture map, a series of derived images of successively lower resolutions (e.g., factor of 2 degradation in resolution between two derived images)are obtained by filtering a "base" image of the texture map. Each derived image corresponds to a level of detail relevant to viewing the texture map from a specified apparent distance. Texture mapping can be performed using any one of a number of filtering modes known to those skilled in the art, including (a) point sampling, which selects for each texel in the resulting texture the nearest texel in the highest resolution texture map; (b) bilinear, which interpolates each texel of the resulting texture from the four closest texels in the highest resolution texture map; (c) MIP1, which selects for each texel of the resulting texture the nearest texel in the texture map of nearest level of detail; (d) MIP2, which linearly interpolates, for each texel of the resulting texture, between the nearest texels in the texture maps of the two nearest levels of detail; (e) MIP4, which interpolates bilinearly, for each texel of the resulting texture, four nearest texels in the texture map of the nearest level of detail; and (f) MIP8, which interpolates trilinearly, for each texel of the resulting texture, four texels in each of the texture maps of the two nearest levels of detail.

Image processing typically involves one or more fast central processing units (CPU) in conjunction with a large amount of memory for image data and intermediate results. As can be seen from the description above, texture mapping is both computationally and memory access intensive. For example, in a trilinear operation under mip-mapping, eight texels are fetched from two images. Since the texels fetched under texture mapping are spatially correlated (e.g., neighboring texels), a memory architecture taking advantage of this spatial locality of reference is desired.

SUMMARY OF THE INVENTION

The present invention provides a reconfigurable cache for optimizing texture mapping applications. In one embodiment, the reconfigurable cache includes: (a) first and second memory banks each having address terminals for receiving a memory address, and providing an output datum on an output data bus in response to the memory address; and (b) a multiplexer circuit receiving the memory address of the first memory bank, the output datum of the first memory bank and a control signal. In that configuration, the multiplexer circuit provides the memory address to the address terminals of the second memory bank when the control signal is asserted, and provides the output datum of the first memory bank to the second memory bank, when the control signal is deasserted. The reconfigurable cache can further include a second multiplexer circuit receiving and selecting as an output datum of the reconfigurable cache one of the output data from the first and second memory banks.

In one embodiment of the reconfigurable cache, when the control signal is deasserted, an additional tag bit is examined to determine if the memory address specifies a datum stored in said second memory bank.

In accordance with another aspect of the present invention, when the reconfigurable cache is used in conjunction with a first texture map and a second texture map (e.g., in mip-mapping, for interpolation between texture maps of different levels of detail), the first and second texture maps are associated respectively with two separate halves of the reconfigurable cache.

According to another aspect of the invention, a method provides a mapping pattern for mapping a graphical image to a cache having a number of cache lines. That method includes (a) computing a number of pixels to be held in the cache and a number of pixels in each of the cache lines; (b) organizing along a first dimension and a second dimension the pixels in the cache into a square, or a rectangle having an aspect ratio of 2:1 when the number of pixels in the cache is an odd power of 2; (c) organizing along the first and second dimensions the pixels in each cache line in a square or a rectangle having an aspect ratio of 2:1, when the number of pixels in the cache line is an odd power of 2; (d) computing the numbers of cache lines along the first and second dimensions of the cache; and mapping a first group of pixels in the graphical image in accordance with a mapping pattern conforming to the organizations of the cache and the cache lines. Thereafter, a second mapping pattern for the graphical image is achieved by a method comprising the steps of: (a) taking a copy of the first mapping pattern; (b) splitting the first mapping pattern into two halves along first dimension; (c) forming a new mapping pattern by exchanging the two halves; and (d)combining the first mapping pattern with the new mapping pattern along the second dimension to form a third mapping pattern; and tiling the graphical image according with said third mapping pattern.

The present invention is better understood upon consideration of the detailed description below and the accompanying drawings.

BRIEF DESCRIPTION OF THE DRAWINGS

FIG. 7b shows a mapping pattern 720 for mapping each tile in a texture map to one of eight locations in texture cache 200, having even better performance than mapping pattern 700 of FIG. 7a.

To simplify discussion in the detailed description below, like elements in the figures are assigned like reference numerals.

DETAILED DESCRIPTION OF THE PREFERRED EMBODIMENTS

Figure 1:
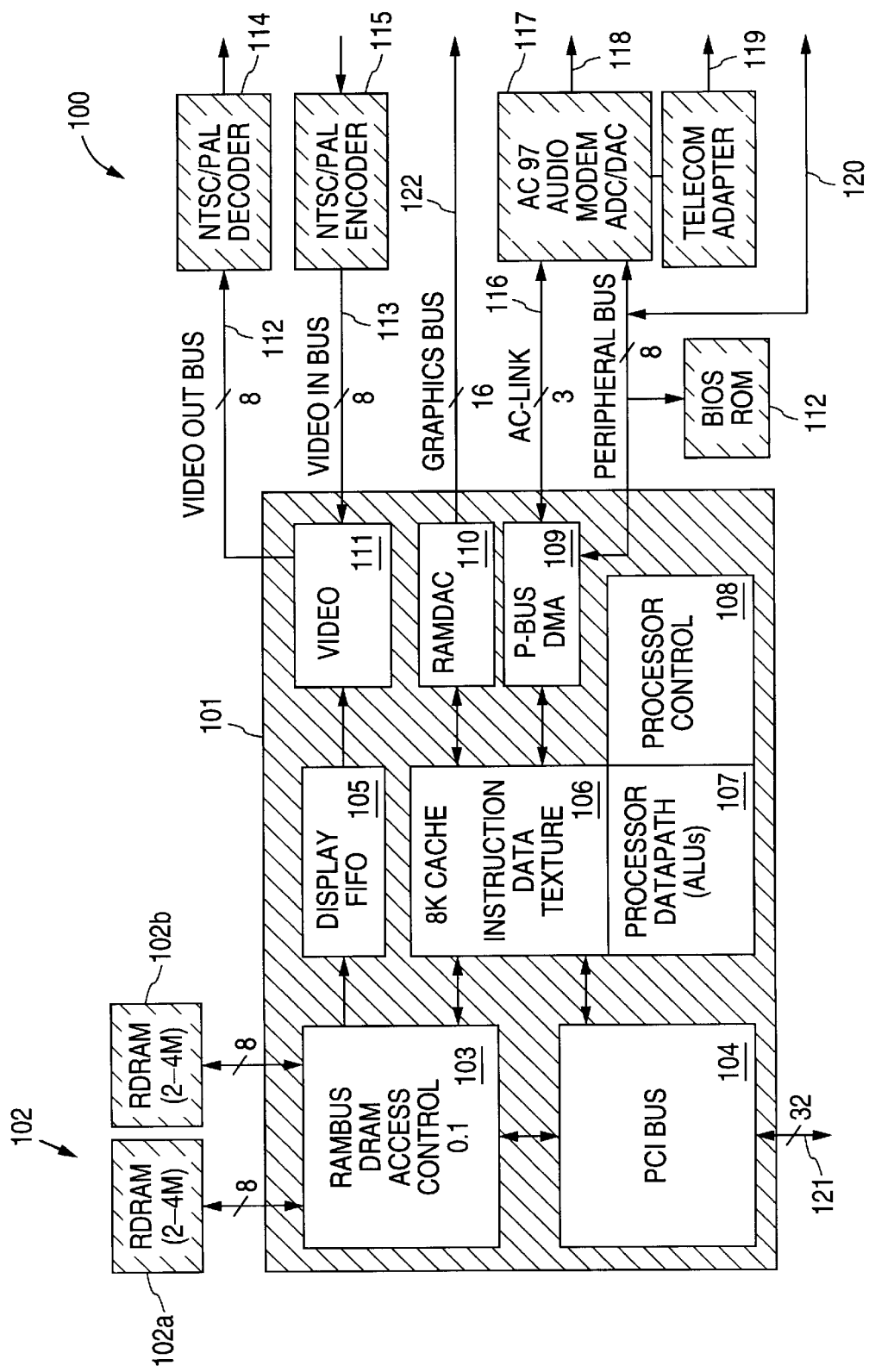
FIG. 1 shows a computer system 100 to which one embodiment of the present invention is applicable.

FIG. 1 shows a computer system 100 to which one embodiment of the present invention is applicable. In computer system 100, a single-chip signal processor 101 accesses a memory system 102 including two Rambus channels 102a and 102b. Rambus channels 102a and 102b are high speed memory units accessible using an on-chip Rambus memory access circuit 103, which design is provided by Rambus, Inc. of Mountain View, Calif. Signal process 100 typically operates under control of a host processor (not shown) and interfaces with a number of multimedia peripherals. For example, FIG. 1 shows signal processor 100 includes (a) an on-chip video controller 111 providing an 8-bit digital video signal on video output bus 112 and receiving an 8-bit digital video signal on video input bus 113, and (b) an on-chip RAMDAC unit 110 interfacing a 16-bit graphics output bus, which drives an external graphics display terminal over graphics bus 122. As shown in FIG. 1, the 8-bit video signals of video input bus 113 and video output bus 112 are respectively encoded and decoded by NTSC/PAL encoder 115 and NTSC/PAL decoder 114. PCI interface 121 is controlled by on-chip PCI controller 104.

In addition, FIG. 1 shows signal processor 101 interfacing through an on-chip peripheral bus control unit 109 to (a) a 3-terminal analog interface 116 and (b) an 8-bit peripheral interface 120. As shown in FIG. 1, a peripheral control unit 117 is coupled to analog bus 120 and analog interface to provide multichannel audio signals, an analog interface to a modem on signal processor 101 and other applications.

Figure 2:
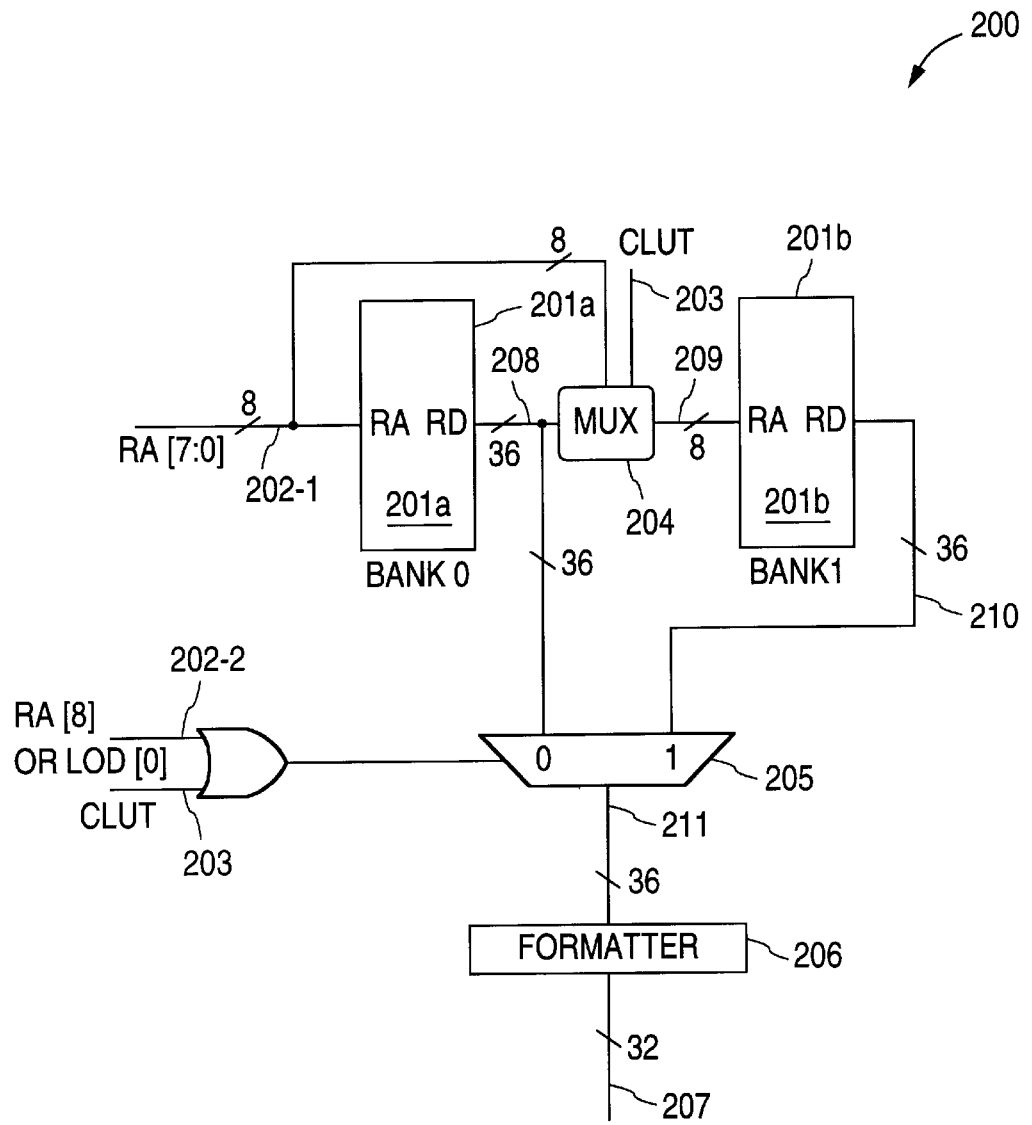
FIG. 2 shows the data portion of texture cache unit 200, which is provided according to one embodiment of the present invention.

Signal processor 101 includes a central processing unit consisting of a datapath 107, which includes multi-stage pipelined arithmetic logic units, and a processor control unit 108. A static random access memory (SRAM) unit 106 provides a total of 8K bytes of memory for use as an instruction cache, a data cache and a texture cache. Texture cache 200, which is shown in FIG. 2 and described in further detail below, is allocated 2K bytes of SRAM 106. A display FIFO memory 105 buffers video data to and from Rambus channels 102a and 102b. RAMDAC 110 and peripheral bus controller 109 access the memory system, including SRAM 106, by direct memory access (DMA).

FIG. 2 shows the data portion of texture cache 200, which is provided in accordance with one embodiment of the present invention. Texture cache 200 can be configured in one of two configurations, which are respectively referred below as "RGB" and "CLUT" mode. Under RGB mode, the texels are represented by intensities of the texels. Under "CLUT" mode, which stands for "color look-up table", the texels are each provided as an index into a lookup table ("palette") of color intensities. Under RGB mode, each word of texture cache 200, which is internally organized as a 36-bit word, can pack one, two or four texels. The following formats are some of the formats implemented in texture cache 200: (a) the "ARGB" format, under which each texel is represented by an 8-bit "alpha" intensity value, an 8-bit "red" intensity value, an 8-bit "blue" intensity value, and an 8-bit "green" intensity value; (b) the "RGB666" format, under which two texels are stored in each 36-bit word, each texel consisting of 6-bit "red", "blue" and "green" intensities; and (c) the "LUMA" format, under which each 36-bit word packs four texels representing intensities. In this embodiment, under CLUT mode, the palette is indexed either by an 8-bit value ("CLUT8") or a 4-bit value ("CLUT4"). Dependent on the organization of the palette, under CLUT mode, each 36-bit word of the 1K byte texture cache packs four or eight texels.

Under RGB mode, texture cache 200 operates as a 2K word cache implemented by two memory banks of 1K bytes (9-bit bytes) each. Under CLUT mode, texture cache 200 allocates one of the two 1K-byte memory banks as a texture cache, and the other 1K-byte memory bank for the palette. Reconfigurability is achieved by the circuit of FIG. 2. As shown in FIG. 2, texture cache 200 includes 1K-byte memory banks 201a and 201b, each memory bank being accessed by an 8-bit word address RA[7:0], provided respectively on address busses 202-1 and 209 respectively. Memory banks 201a and 201b provide 36-bit output values on data busses 208 and 210 respectively. Multiplexing circuit 204 reconfigures the connectivity between memory banks 201a and 201b according to whether texture cache 200 operates under RGB or CLUT mode. Under RGB mode, the 512 locations of texture cache 200 is accessed by a 9-bit address, eight bits of this 9-bit address are provided on address bus 202-1. In this instance, multiplexing circuit 204 provides the value on address bus 202-1 (i.e., the aforementioned eight bits of the 9-bit address) to the address bus 209 of memory bank 201b. The remaining bit of the 9-bit address is provided at terminal 202-2 of multiplexing circuit 205 to select one of the values on data busses 208 and 209 as an 36-bit output value on bus 211. A formatter circuit 206, discussed in further detail below, provides the 32-bit output value of texture cache 200 on output bus 207.

Under CLUT mode, instead of the 8-bit value of address bus 202-1, multiplexing circuit 204 places on address bus 209 an 8-bit value, which value corresponds to one of four 8-bit values (CLUT8) or one of eight 4-bit values (CLUT4) extracted from the 36-bit output value on data bus 208. This 8-bit value on address bus 209 selects for output on data bus 210 a color intensity from the palette stored in memory bank 201b. The 36-bit output value data bus 210 is selected by multiplexing circuit 205 for output on data bus 211. As in the RGB mode, formatter circuit 206 provides a 32-bit value on data bus 207 as the output value of texture cache 200.

Figure 3:
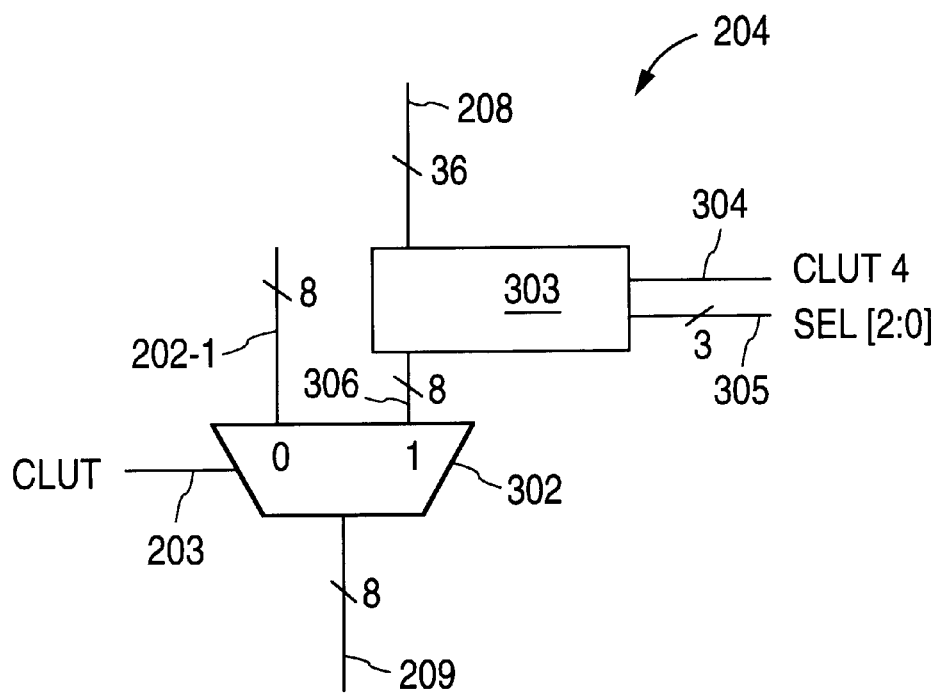
FIG. 3 shows an implementation of multiplexing circuit 204 of FIG. 2.

Multiplexing circuit 204 can be implemented by the circuit shown in FIG. 3. As shown in FIG. 3, a control signal (labeled "CLUT"), which is deasserted during RGB mode, is provided at terminal 203 of multiplexer circuit 302 to select for output on data bus 209 either the 8-bit value of address bus 202-1, during RGB mode, or the 8-bit output value of selector circuit 303, during CLUT mode. Selector circuit 303 receives the 36-bit value on data bus 208, which is the output bus of memory bank 201a (FIG. 2), and selects for output on output bus 306 an 8-bit value, which value corresponds to one of four 8-bit values (CLUT8) or one of eight 4-bit values (CLUT4) extracted from the 36-bit output value on data bus 208. Selector circuit 303 responds to selection control signals SEL[2:0] at terminals 305 and a mode control signal at terminal 304. When the mode control signal at terminal 304 is selected, indicating that a 4-bit index is used to index into the palette stored in memory bank 201b, a nibble address is provided on selection control signals at terminals 305. The 4-bit value extracted is zero-extended and placed on 8-bit bus 306. Otherwise, i.e., the mode control signal at terminal 304 is deasserted, indicating an 8-bit index is used to index into the palette in memory bank 201b, a byte address is provided at the selection control signals at terminals 305 to select an 8-bit value on 8-bit bus 306.

Figure 8:
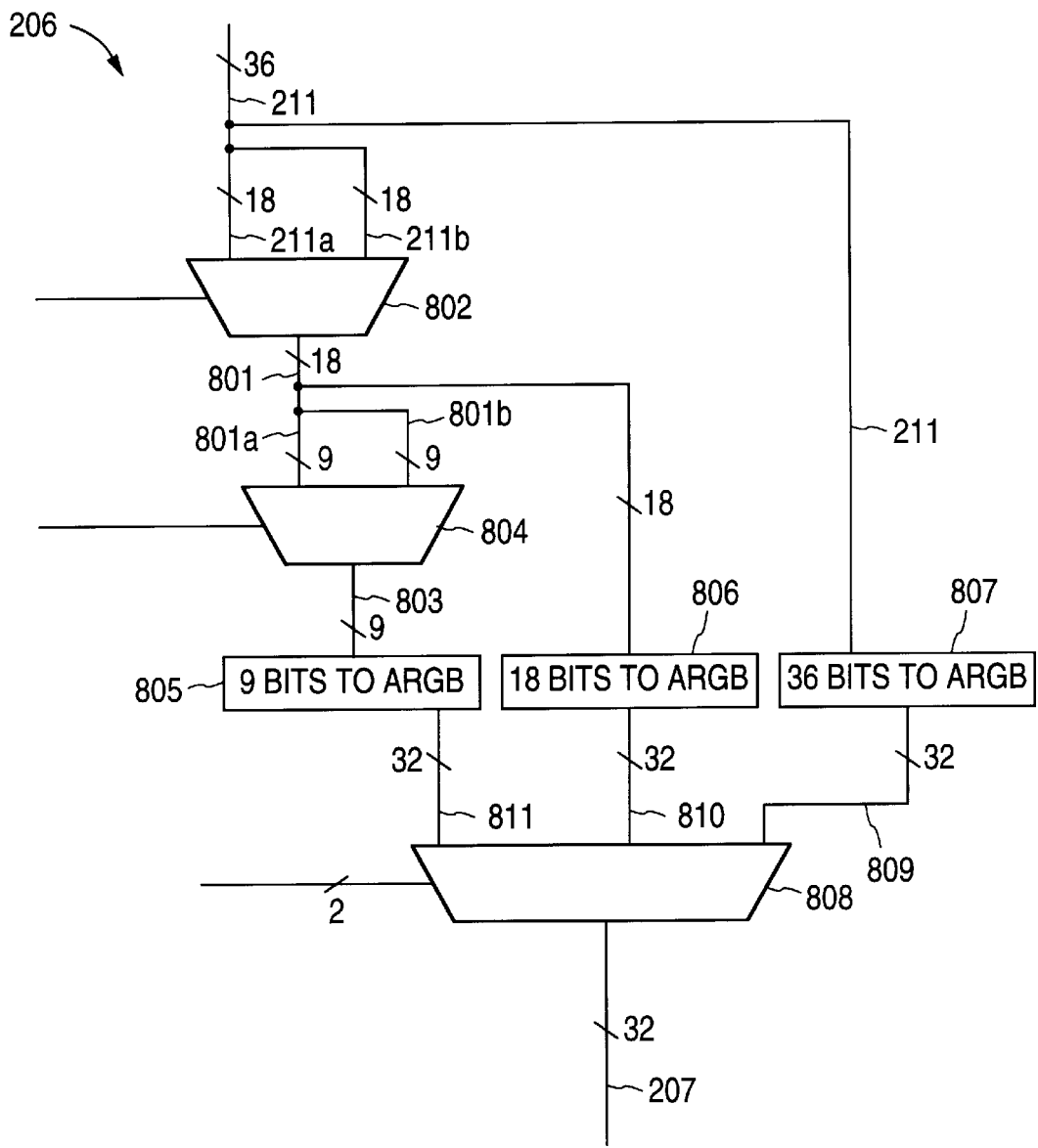
FIG. 8 shows an implementation of formatter circuit 206 of FIG. 2.

Formatter circuit 206, which is implemented in this embodiment by the circuit shown in FIG. 8. As shown in FIG. 8, formatter circuit 206 first selects a texel from the 36-bit value on data bus 211. If the 36-bit value on data bus 211 is in ARGB format, the four component 8-bit values are provided in order on 32-bit bus 809 by an ARGB formatter 807. Multiplexer 808 selects in this instance the value of bus 809 to provide on the 32-bit output terminals 207.

Figure 4:
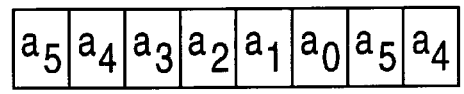
FIGS. 4 and 5 show scaling operations by formatter circuit 204 scaling a 6-bit color intensity value to a 8-bit representation, and a 4-bit luma or chroma to an 8-bit representation.
Figure 5:
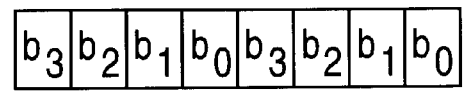

If the 36-bit value on data bus 211 consists of two RGB666 texels, which are respectively provided on the upper and lower 18-bit halfwords 211a and 211b. Multiplexer 802 selects one of these two texels, providing the selected texel on 18-bit bus 801. ARGB formatter 806 then provides in the most significant 8-bit byte of 32-bit output bus 207, corresponding to the "alpha" byte under ARGB format, a hexadecimal value 'FF. The remaining 8-bit bytes, corresponding respectively, in order, the "red", "green" and "blue" bytes under ARGB format are each assigned a scaled 8-bit value derived from the corresponding 6-bit color intensity. The scaled 8-bit value is obtained by duplicating the most significant two bits of the 6-bit value in the least significant two bits of the resulting 8-bit value. For example, as shown in FIG. 4, the scaled value of the 6-bit value $a_5a_4a_3a_2a_1a_0$ is scaled to $a_5a_4a_3a_2a_1a_0a_5a_4$. The scaling is equivalent to multiplying the 6-bit color intensity by the binary decimal 1.000001, so that the color intensity representable by the 8-bit intensity covers the full integer range 1-255. The scaled value provides better precision in subsequent operations. A similar scaling operation can be provided for a 4-bit texel format. The 8-bit scaled result $b_3b_2b_1b_0b_3b_2b_1b_0$ of a 4-bit value $b_3b_2b_1b_0$ is shown in FIG. 5.

Under the LUMA format, four 8-bit intensities are provided on the 36-bit bus 211. Multiplexers 802 and 804 are configured so as to select one the four 8-bit lumas on bus 211, providing the selected 8-bit luma on 9-bit bus 803. ARGB formatter 805 then provides at the most significant 8-bit byte of 32-bit bus 207, corresponding to the alpha value, the hexadecimal value 'FF, and in each of the remaining 8-bit bytes of 32-byte 207, the 8-bit value on 9-bit byte 803.

As discussed above, texture cache 200 supports nibble (e.g., CLUT4), byte (e.g., CLUT8 and LUMA), 2-byte (e.g., RGB666) and 4-byte (e.g., ARGB) texel formats. In the implementation described above, under RGB mode, texture cache 200 stores eight cache lines of 256 bytes each. To exploit locality of reference in access to texels, the cache line preferably covers pixels within a square area because, in general, correlated accesses to neighboring texels in the u and v directions are equally likely. To simplify the addressing within the cache line, however, it is preferable that the number of texels in each dimension of the area covered by a cache line to be a power of 2. Thus, under nibble format, a cache line covers a 32 texels by 16 texels area. Under byte format, a cache line covers a 16 texel by 16 texel area. Under 2-byte format, a cache line covers a 16 texel by 8 texel area. Under 4-byte format, a cache line covers a 8 texel by 8 texel area. The area covered by a cache line is referred to as a "tile".

In the present embodiment however, the programmer's view of a 256-byte cache line does not change under CLUT mode, even though only 128 bytes is actually stored for each cache line(in memory bank 201a). The 128-byte cache line is accommodated by the hardware in the present embodiment, substantially transparent to the programmer, by an additional tag bit. Programming is simplified by hiding this level of detail from the programmer. Further, simulation has shown that less thrashing occurs by maintaining the same number of cache lines and reducing the size of each cache line than reducing the number of cache line but maintaining the size of each cache line. Tag matching circuit 600 of FIG. 6 implements tag matching in texture cache 600.

Figure 6:
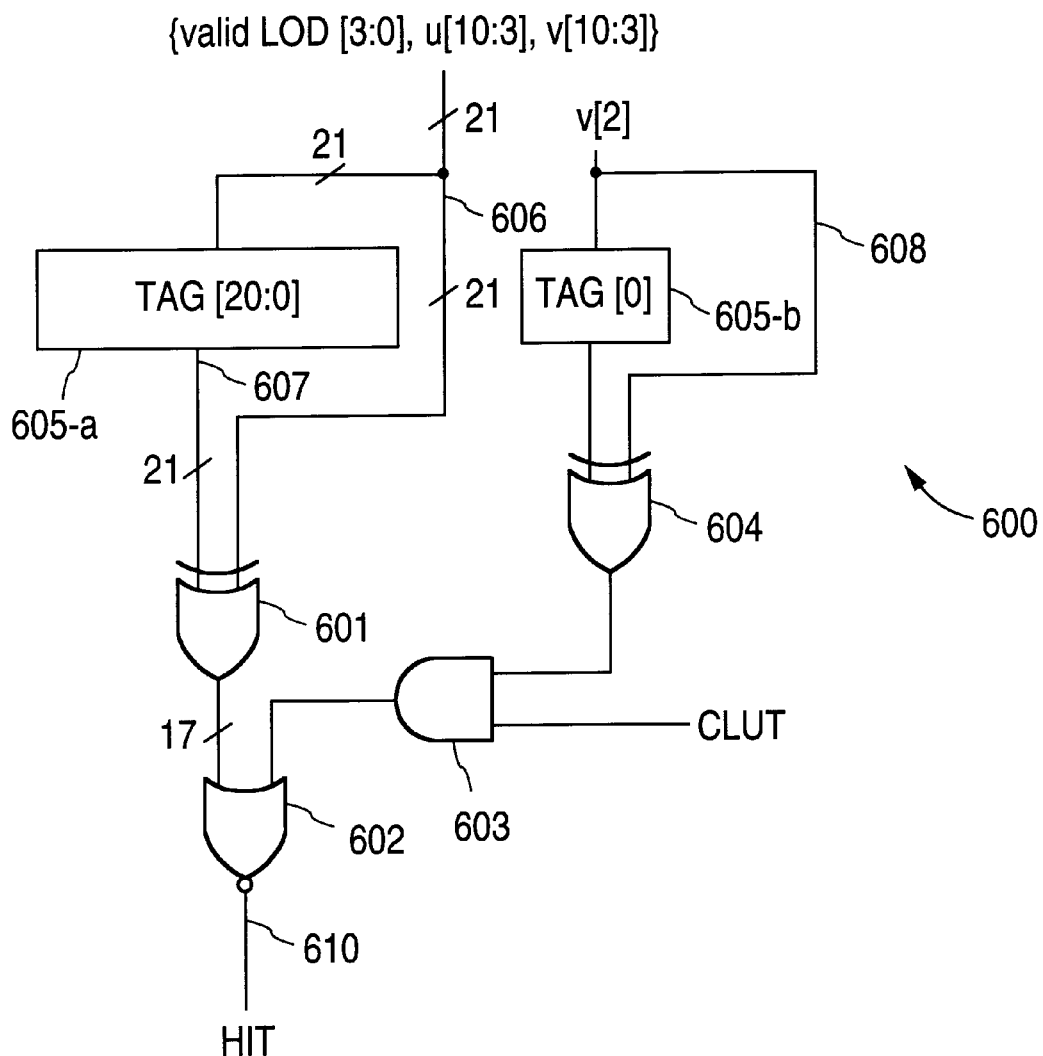
FIG. 6 is a schematic diagram of a tag matching circuit 600 which allows a programmer's view of a fully cached tile, even when only half of the programmer's tile is actually cached under the CLUT mode operation in texture cache 200.

As shown in FIG. 6, a conventional 21-bit tag is provided in register 605-a, providing one "valid" bit, a 4-bit value indicating the level of detail of texture map (explained further below) and 16 address tag bits. Under 4-byte texel mode, for example, each tile includes an 8 texel by 8 texel area, the address tag bits could be provided as the u[10:3] and v[10:3] texture addresses. The address tag bits in texture cache 200 described here are implemented in one embodiment by portions of a logical address in texture space, which need not correspond to any portion of a physical memory address, although one skilled in the art would appreciate that the present invention is applicable regardless of whether the tag bits are logical or physical addresses. When the 21 tag bits in the register 605a (i.e., the output value on bus 607), matches the input tag bits on bus 606, a bit-wise exclusive-OR (represented by "exclusive-OR gates" 601) of the 21 stored bits and the 21 input tag bits would yield all 21 zeros. Otherwise, i.e., if at least one of the 21 tag bits are not matched, at least one of the output bits of exclusive-OR gates 601 would be a '1', and the cache hit control signal would be generated at terminal 610 by 18-input NOR circuit 602. Under CLUT mode, however, tag matching circuit involves an additional address bit in 1-bit register 605-b, e.g. v[2] under the 4-byte texel mode, to determine whether the desired 128-byte cache line is stored in memory bank 201a. If the desired 128-byte cache line is not stored in memory bank 201a, the input tag bit at terminal 608 does not match the stored tag bit in 1-bit register 605-b, as detected by exclusive-OR circuit 604, the output signal on output terminal 610 of NOR gate 602 would be asserted, since the control signal at AND gate 603 is asserted. In practice, the address bit that divides the tile into upper and lower halves, or into left and right halves is used as the additional tag bit to maximize cache hit rate in one direction (u or v) of the texture space.

Figure 7A:
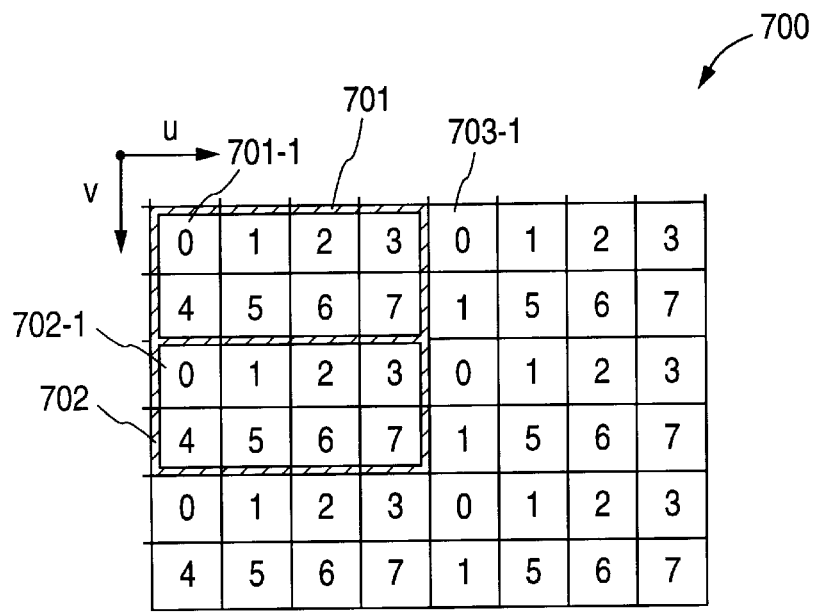
FIG. 7a shows a mapping pattern 700 for mapping each tile in a texture map to one of eight locations in texture cache 200.

Texture cache 200 is provided as a direct-mapped cache. To maximize the advantage of locality of reference, adjacent tiles in the texture map should preferably be mapped to different locations of texture cache 200. A mapping scheme that achieves this result is illustrated in FIG. 7a, which shows a contiguous group 701 of eight tiles in a texture map being mapped to different 256-byte locations in texture cache 200. The number in each tile corresponds to one of eight 256-byte locations of texture cache 200. In a 4-byte texel format, for example, each tile represent a square area of texels. In a 2-byte texel format, each tile represent a rectangular area with an aspect ratio of 2:1. The following example first discusses the case when the tile covers a square area of texels. The general case would be discussed below thereafter. In FIG. 7a, mapping pattern 700 divides the texture map into adjacent groups of eight tiles (e.g. 4 tile by 2 tile group 702), where corresponding tiles between groups are aliased (i.e., mapped to the same locations) in texture cache 200. Under mapping scheme 700, from any texel, accesses to texels within 4 tiles in the u direction and within 2 tiles in the v direction do not necessarily generate a cache miss, if all the tiles concerned are cached in texture cache 200. A cache miss, however, is necessarily generated when texels in aliased tiles (e.g., a texel in tile 701-1 and a texel in either tile 702-1 or tile 703-1) are accessed successively. Thus, for a square tile the "worst" case alias distance (i.e., the shortest distance between alias tiles) is 2 tile units. For a 4-byte texel format, where each tile represents an area of 8 texel by 8 texel, this distance equals 16 texels. In that 4-byte texel format, each tile can be specified in texture space by coordinate (u[m:3], v[n:3]), where m, n are integers greater than 3, the 3-bit cache line number for each tile under mapping pattern 700 can be generated by {v[3],u[4:3]}.

Mapping scheme 700 of FIG. 7a, results from a general scheme that depends on a number of parameters, including: (a) the size of a texel; (b) the size of the cache line; (c) the size of the texture cache; (d) the associativity, if any, implemented in the texture cache; and (e) the filtering mode. Typically, the size of the texel, the size of the cache line and the size of the texture cache are all powers of two. In general, a mapping scheme, such as mapping scheme 700 of FIG. 7a, can be derived from the following procedures ("general method"):

1. Compute the number of texels that can be held in the cache ($T_{pc}$) and the number of texels in each cache line ($T_{p1}$). $T_{pc}$ is size of the cache divided by the size of the texel and $T_{p1}$, is the size of the cache line divided by the size of the texel.

2. Organize the texels in the cache in a manner that would form a square, or a rectangle having a horizontal-to-vertical aspect ratio of 2:1, when $T_{pc}$ is an odd power of 2 (empirically, there is a slightly higher probability of traversing a texture map in the horizontal or "u" direction than the vertical or "v" direction). The numbers $T_{vC}$ and $T_{hC}$ of texels along the vertical (v) and horizontal (h) dimensions of the cache are given by:

$$T_{vc} = 2^{\text{floor}(0.5*\log_2 T_{pc})}; \; T_{hc} = \frac{T_{pc}}{T_{vc}}$$

3. Organize the texels in each cache line to be either a square, or a rectangle having a horizontal-to-vertical aspect ratio of 2:1, when $T_{p1}$, is an odd power of 2. The numbers $T_{v1}$ and $T_{h1}$ of texels along the vertical and the horizontal dimensions of the cache line are give by:

$$T_{vl} = 2^{\text{floor}(0.5*\log_2 T_{pl})}; \; T_{hl} = \frac{T_{pl}}{T_{vl}}$$

4. The numbers $l_{vc}$ and $l_{pc}$ of lines or tiles along the vertical and horizontal dimensions of the cache ar given by:

$$l_{vc} = \frac{T_{vc}}{T_{vl}}; \; l_{hc} = \frac{T_{hc}}{T_{hl}}$$

Figure 7B:
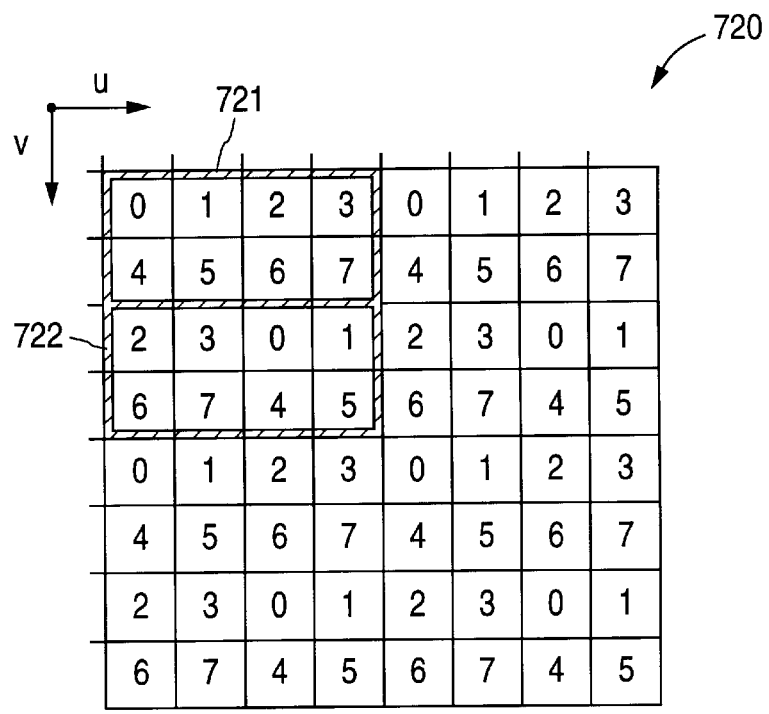

Performance of texture cache 200 can be enhanced, however, by mapping tiles of corresponding locations in adjacent groups of eight tiles, e.g., groups 721 and 722 of FIG. 7b, to different locations of texture cache 200. For example, such a mapping scheme is illustrated by mapping pattern 720. In mapping scheme 720, the cache line assignments for the tiles in the 4 by 2 group 721 is an exchange of the cache line assignments for the tiles in the 4 by 2 group 722 about an axis along the v direction which divides the longer dimension (i.e. u direction) into equal parts. Groups 722 and 721 together form a "supertile" in which aliasing occurs at 4 tile units (i.e., successive accesses to texel within four tiles in either the u direction or the v direction do not necessarily generate a cache miss in texture cache 200). The worst case alias distance in mapping scheme 720 occurs at 45 degrees from the u and v directions. For square tiles, this distance is thus twice the square-root of 2, or approximately 2.83 tile units. For a 4-byte texel format, where each tile represents an area of 8 texel by 8 texel, the worst case alias distance is thus about 22.6 pixels. For a 4-byte texel format, each tile can be specified in texture space by coordinate (u[m:3], v[n:3]), where m, n are integers greater than 3, the 3-bit cache line number for each tile in mapping pattern 720 can be generated by {v[3],u[4]⊕v[4],u[3]}, where ⊕ is the exclusive-OR operator. As can be seen by inspection from the expression provided above for mapping pattern 700, the improvement in alias distance can be achieved by an exclusive-OR operation in the cache address generation mechanism.

Generally, if the number of texels $T_{vc}$ in the vertical direction is less than the number of tiles $T_{hc}$ in the horizontal direction, the horizontal direction is referred to as the "major axis" and the vertical dimension is considered the "minor axis". Otherwise, i.e., if the number of texels $T_{vc}$ in the vertical direction is greater than or equal to the number of tiles $T_{hc}$ in the horizontal direction, the vertical direction is referred to as the "major axis" and the horizontal direction is considered the "minor axis". A supertile is obtained by (a) taking a group of tiles which tile the cache in the manner described in the general method above; (b) splitting the mapping pattern of the group of tiles into two halves along the minor axis; (c) forming a new mapping pattern by exchanging the two halves obtained in (b); and (d)combining the mapping pattern of the general method with the new mapping pattern along the minor axis.

Mapping patterns 700 and 720 can be implemented also in a set associative cache.

Texture cache 200 also provides support for mip-mapping. Under mip-mapping, each successive prefiltered texture map has only one half resolution in each of the u and v directions as the previous texture mapped. The MIP2 and MIP8 filtering modes each involve interpolation between texture maps of two levels of detail. For example, as mentioned above, the MIP8 filtering mode uses a trilinear interpolation involving four texels in each two successive texture maps nearest to a specified apparent distance. The advantage of locality of reference can be achieved when interpolating between texture maps of two successive levels of detail by assigning consecutive integers to successive texture maps as an index of the level of details in these texture maps, so that one of the two successive texture maps in an interpolation has an even index, while the other one of the two successive texture maps has an odd index. In one implementation, up to 10 texture maps of different levels of detail are provided. In that implementation, a 4-bit index (LOD[3:0]) is assigned each texture map. If the texels in an even-indexed texture map are mapped only to even cache lines, and the texels in the odd-indexed texture map are mapped only to odd cache lines, there would be a higher probability that a cache miss may not be generated for a large number of accesses to these texture maps. Texture cache 200 can be used to achieve this even/odd partition of cache lines to texture maps. Referring back to FIG. 2, under RGB mode, if the least significant bit (i.e., bit LOD[0]) of the index of the texture map accessed is provided at terminal 202-2, texels in the even-indexed texture map are cached in memory bank 201*a* and texels in the odd indexed texel map are cached in memory bank 201*b*. Under CLUT mode, one implementation uses the higher cache lines of memory bank 201*a* for the odd-indexed texture map, and the lower cache lines of memory bank 201*a* for the even-indexed texture map. In general, to support mip-mapping, the present invention provides for dividing the texture cache into two halves, so that texels from two different levels of detail of a texture map are cached in two different halves.

The above detailed description are provided to illustrate the specific embodiments of the present invention and is not intended to be limiting. Numerous modifications and variations within the scope of the present invention are possible. The scope of the present invention is defined by the appended claims.

I claim:

1. A reconfigurable cache, comprising;
   first and second memory banks each having address terminals for receiving a memory address, and providing an output datum on an output data bus in response to said memory address; and
   a multiplexer circuit receiving said memory address of said first memory bank, said output datum of said first memory bank and a control signal, wherein said multiplexer circuit providing said memory address to said address terminals of said second memory bank when said control signal is asserted, and providing said output datum of said first memory bank to said second memory bank, when said control signal is deasserted.

2. A reconfigurable cache as in claim 1, further comprising a second multiplexer circuit receiving and selecting as an output datum of said reconfigurable cache one of said output data from said first and second memory banks.

3. A reconfigurable cache as in claim 1, wherein when said control signal is deasserted, an additional tag bit is examined to determine if said memory address specifies a datum stored in said second memory bank.

4. A reconfigurable cache as in claim 1, wherein said reconfigurable cache is provided as a texture cache used in conjunction with a first texture map and a second texture map, said first and second texture maps being associated with said first and second memory banks.

5. A method for providing a mapping pattern for mapping a graphical image to a cache having a number of cache lines, comprising the steps of:
   computing a number of pixels to be held in said cache and a number of pixels in each of said cache lines;
   Organizing along a first dimension and a second dimension said pixels in said cache into a square, or a rectangle having an aspect ratio of 2:1 when said number of pixels in said cache is an odd power of 2;
   Organizing along said first and second dimensions said pixels in each cache line in a square or a rectangle having an aspect ratio of 2:1, when said number of pixels in said cache line is an odd power of 2;
   computing the numbers of cache lines along said first and second dimensions of the cache; and
   mapping a first group of pixels in said graphical image in accordance with a mapping pattern conforming to said organizations of said cache and said cache lines;
   creating a second mapping pattern for said graphical image according to a method comprising the steps of:
   (a) taking a copy of said first mapping pattern;
   (b) splitting said first mapping pattern into two halves along first dimension;
   (c) forming a new mapping pattern by exchanging said two halves; and
   (d) combining said first mapping pattern with said new mapping pattern along the second dimension to form a third mapping pattern; and
   tiling said graphical image according with said third mapping pattern.

6. A method for providing a texture cache for supporting accesses to a first texture map and a second texture map, each texel in each texture map having a texel address, said method comprising the steps of:
   providing said texture cache as a first and second sets of addressable memory locations, wherein the address of each memory location in said first set of memory location is distinguishable from the address of a corresponding memory location by the value of a selected address bit;
   assigning, as an index, to said first texture map a binary value and to said second texture the complement of said binary value;
   using as an address to said texture cache the combination of said index and said texel address, assigning to said selected address bit said index, thereby mapping texels in said first texture Map to said first set of addressable memory locations and texels in said second texture map to said second said of addressable memory locations.

7. A method as in claim 6, wherein said texture cache comprises a first memory bank and a second memory bank, said first set of memory locations being provided in said first memory bank and said second set of memory locations being provided in said second memory bank.

8. A method as in claim 6, wherein said binary value is the least significant bit of the value of a level of detail index, said values of said level of detail index being integer values assigned consecutively to texture maps of successively greater apparent distances.

\* \* \* \* \*